E. Card,
Shoe Buttoner,
N° 81,250. Patented Aug. 18, 1868.
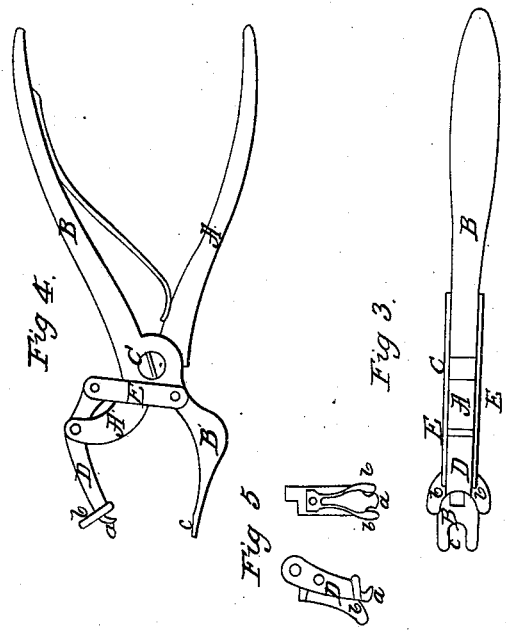
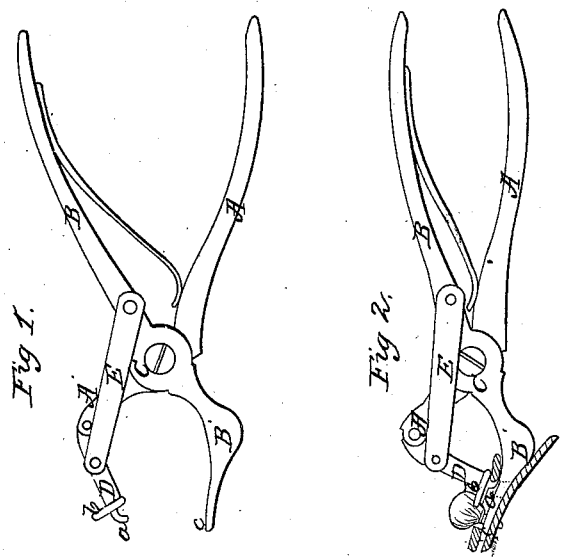
Witnesses;
Josiah G. Smith
S. W. Baker.
Inventor;
Edward Card

UNITED STATES PATENT OFFICE.

EDWARD CARD, OF NORTH PROVIDENCE, RHODE ISLAND.

IMPROVEMENT IN SHOE-BUTTONERS.

Specification forming part of Letters Patent No. 81,250, dated August 18, 1868; antedated August 7, 1868.

*To all whom it may concern:*

Be it known that I, EDWARD CARD, of North Providence, in the county of Providence and State of Rhode Island, have invented an Improved Shoe-Buttoner; and do hereby declare that the following is a full and exact description, reference being had to the accompanying drawings, making a part of this specification.

The nature of my invention consists in the construction of an improved instrument for buttoning ladies' shoes by arranging a jointed arm, provided with a button-hole hook and presser, upon a pair of pinchers.

To enable those skilled in the art to make and use my invention, I will proceed to describe its construction and operation.

Figure 1 represents a side view when opened to its extreme limit; Fig. 2, the same closed; Fig. 3, a top view of Fig. 2; Fig. 4, a side view, showing a different mode of connecting with the jointed arm; Fig. 5, two views of a jointed arm with a button-hole hook and spring-presser.

A and B are the two handles of the pinchers, turning upon the point C. The forward end of the arm B' is furnished with an opening or slot, c. (Shown by dotted lines in Fig. 2, and by top view in Fig. 3.) Upon the arm A' is jointed the arm D, furnished at its outer end with a hook, a, immediately under a presser, b. The arm D is connected to either the handle B or the arm B', as shown in Fig. 1 or Fig. 4, by the bars E E.

The operation of buttoning the shoe is as follows: The slot c is placed just under the button; then, as the arm D comes down, the hook a catches into the button-hole and draws it upon the button, when the presser b bears it down upon the same, completing the operation.

Fig. 5 shows a presser formed by a spring, which is to come down upon each side of the button.

What I claim as my invention, and desire to secure by Letters Patent, is—

1. The use of a jointed arm, D, furnished with hook a and presser b, operating substantially as described.

2. The combination of the opening c, hook a, and presser b, to insert a button in a button-hole, substantially as described.

EDWARD CARD.

Witnesses:
    JOSIAH G. SMITH,
    S. W. BAKER.